United States Patent
Chang

(10) Patent No.: US 7,471,427 B2
(45) Date of Patent: Dec. 30, 2008

(54) WARM-UP CIRCUIT FOR CCFLS

(75) Inventor: Ching-Chung Chang, Taipei (TW)

(73) Assignee: LIte-On Technology Corporation, Taipei (TW)

( * ) Notice: Subject to any disclaimer, the term of this patent is extended or adjusted under 35 U.S.C. 154(b) by 1023 days.

(21) Appl. No.: 10/872,467

(22) Filed: Jun. 22, 2004

(65) Prior Publication Data

US 2006/0001915 A1    Jan. 5, 2006

(51) Int. Cl.
*H04N 1/04* (2006.01)
(52) U.S. Cl. .................. 358/475; 358/474; 358/496; 358/497
(58) Field of Classification Search ........... 358/475, 358/474, 496, 497; 399/51
See application file for complete search history.

(56) References Cited

U.S. PATENT DOCUMENTS

| 5,907,742 A * | 5/1999 | Johnson et al. ............ 399/51 |
| 6,198,234 B1 * | 3/2001 | Henry .................... 315/291 |
| 6,906,473 B2 * | 6/2005 | Alexandrov ............. 315/224 |
| 7,183,727 B2 * | 2/2007 | Ferguson et al. ......... 315/308 |

* cited by examiner

*Primary Examiner*—Houshang Safaipour
(74) *Attorney, Agent, or Firm*—Rosenberg, Klein & Lee

(57) ABSTRACT

A warm-up circuit adjusts the brightness of a CCFL through using PWM technique for a scanner. The warm-up circuit has an inverter connected to the CCFL for supplying power, and a PWM controller connected to the inverter for outputting a first control signal to the inverter in a warm-up time and outputting a second control signal to the inverter to control the inverter supplying power to the CCFL in a scan time.

10 Claims, 4 Drawing Sheets

WARM-UP CIRCUIT FOR CCFLS

BACKGROUND OF THE INVENTION

1. Field of the Invention

The present invention relates to a warm-up circuit for CCFLs and, more particularly, to a circuit disposed in a scanner to warm up and control the brightness of a CCFL according to a reference voltage.

2. Description of Related Art

Scanners are popular products in a fast developing industry. They can convert images like common photographs, texts and pictures into digital format that can be displayed, edited, stored and printed by a computer. Scanners still use cold-cathode fluorescent lamps (CCFLs) as their primary light sources. The CCFL generally needs a period of time to generate light of stable brightness after it is turned on. This period of time is referred to a warm-up time. That is, before a scanner starts a scanning operation, a warm-up time of about several minutes is required to let the CCFL have a uniform brightness after the power is turned on. The scanning operation can then be carried out.

As shown in FIG. 1, the y-axis represents the brightness of the CCFL in units of $cd/m^2$, while the x-axis represents time t. Under a constant lamp current I of the CCFL, the brightness of the lamp will rise with the time t. When a warm-up time ts is reached, the brightness of the lamp will reach a stable state. For the above adjustment of the brightness of the lamp, the required constant lamp current is provided by an analog voltage controller. That is, an analog voltage is used to adjust the brightness.

After a user turns on the power of a scanner from the off state, it is necessary to wait for a warm-up time of several minutes before scanning. Moreover, when the scanner is used for continuous scanning, the constant lamp current continually flowing to the lamp will produce a lot of heat, which would cause structural deformation and would have negative effect on scanning quality. In other words, the warm-up time will have negative effect on the operation efficiency of a scanner by slowing the scanning speed, and heat produced by the lamp will have negative effect on the scanning quality. Therefore, shortening the warm-up time and controlling the constant lamp current will enhance the operation efficiency of the scanner and reduce heat produced by the lamp to avoid structural deformation and also improve the scanning quality.

SUMMARY OF THE INVENTION

One object of the present invention is to provide a warm-up circuit for CCFLs. The warm-up circuit adjusts the brightness of a CCFL through using a pulse width modulation (PWM) technique for a scanner. The warm-up circuit provides a first lamp current to the CCFL for fast achieving a stable brightness of the CCFL after the scanner is turned on. After the stable brightness of the CCFL is achieved, the scanner can start to scan. At the moment when the scanner starts to scan, the warm-up circuit will provide a second lamp current to the CCFL for maintaining the stable brightness thereof. When the scanner scans, the warm-up circuit will momentarily get a feedback signal of the emission status of the CCFL and a feedback signal of the heating status of the CCFL. After comparison and processing, the second lamp current for the CCFL can be changed in real time for adjusting the brightness and the dissipated-heat of the CCFL.

The warm-up circuit for CCFLs of the present invention comprises an inverter connected to the CCFL for supplying power, and a PWM controller connected to the inverter. The PWM controller outputs a first control signal to the inverter in a warm-up time and then outputs a second control signal to the inverter to control the inverter supplying the power to the CCFL in a scan time.

The first control signal and the second control signal control the inverter for producing a first lamp current and a second lamp current for the CCFL, respectively. An RC circuit connected to the PWM control unit is further used to adjust the warm-up time of the CCLF by adjusting the resistance value and capacitance value of the RC circuit. Moreover, the duty ratio of the first control signal is larger than that of the second control signal. This design will control the inverter to provide a larger first lamp current and a smaller second lamp current.

BRIEF DESCRIPTION OF THE DRAWINGS

The various objects and advantages of the present invention will be more readily understood from the following detailed description when read in conjunction with the appended drawing, in which.

DETAILED DESCRIPTION OF PREFERRED EMBODIMENTS

Figure 1:
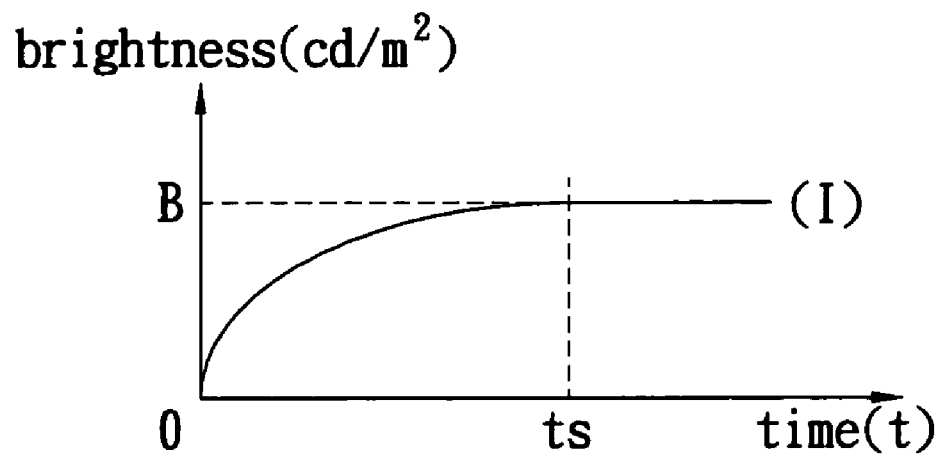
FIG. 1 is a diagram showing the warm-up curve of a constant lamp current of a conventional CCFL.
Figure 2:
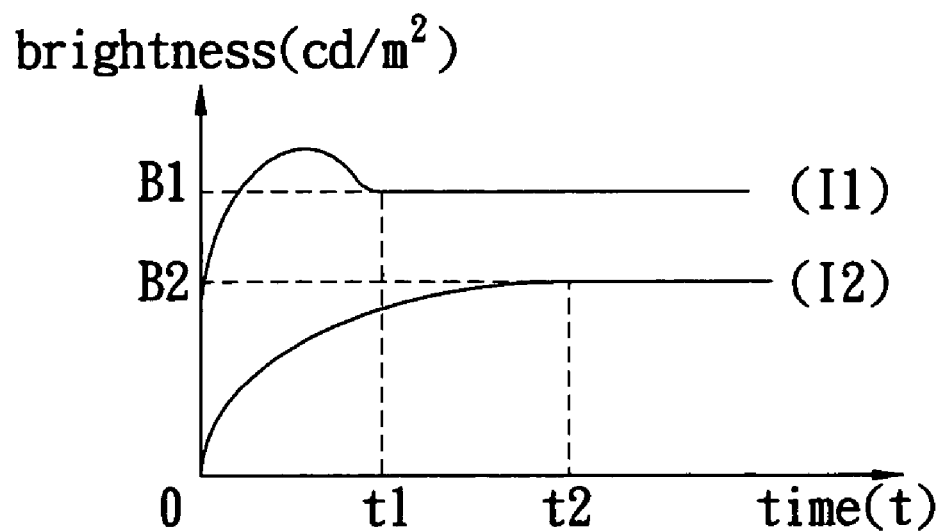
FIG. 2 is a diagram showing the warm-up curve of two different constant lamp currents of a conventional CCFL.

As shown in FIG. 2, the y-axis represents the brightness of a CCFL in $cd/m^2$, while the x-axis represents time t. When a constant lamp current I1 is used to warm up the CCFL, the brightness B1 of the CCFL will reach a stable state at time t1. When a constant lamp current I2 is used to warm up the CCFL, the brightness B2 of the CCFL will reach a stable state at time t2. From FIG. 2, it can be seen that providing an enlarged lamp current to the CCFL can effectively shorten the warm-up time and have a higher stable brightness value.

Figure 3:
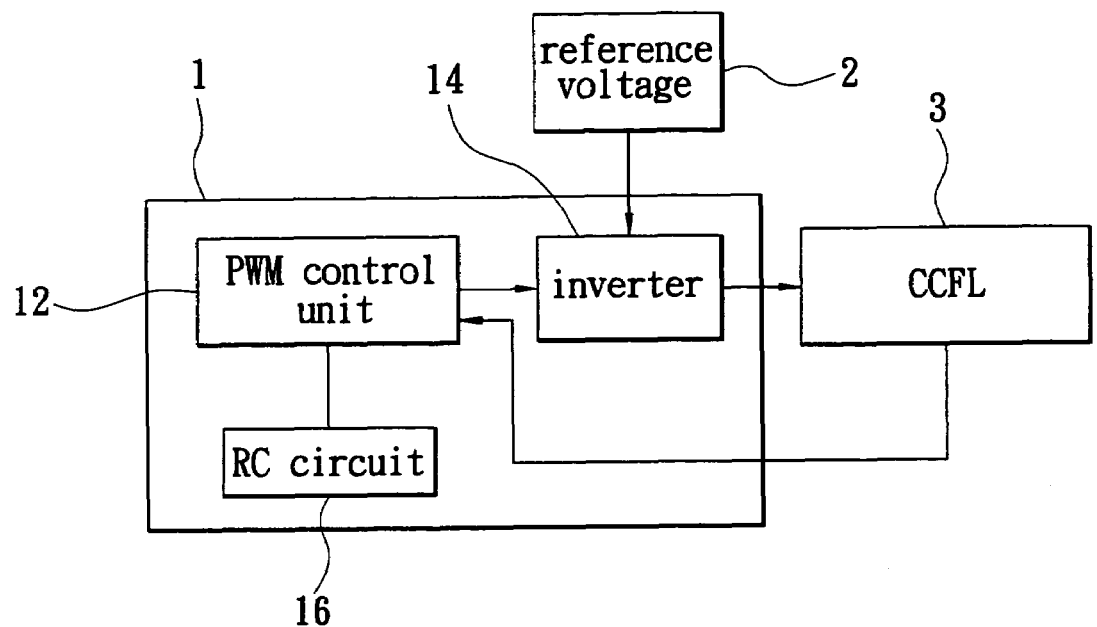
FIG. 3 is a block diagram of a warm-up circuit for CCFLs of the present invention.
Figure 7:
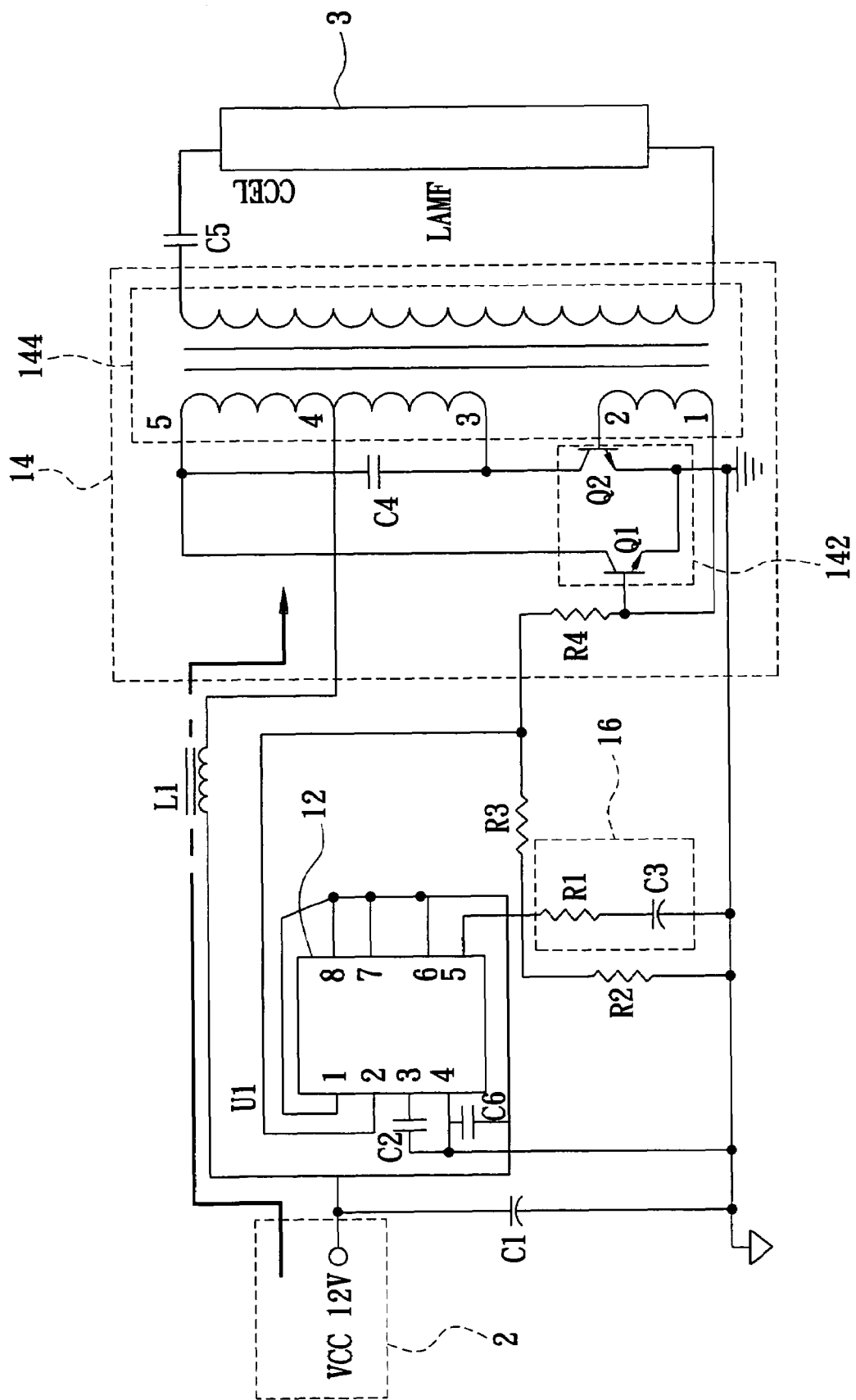
FIG. 7 is a circuit diagram of a warm-up circuit for CCFLs of the present invention.

Reference is made to FIG. 3, in which a warm-up circuit 1 of CCFLs of the present invention is disposed in a scanner (not shown) for controlling the brightness of a CCFL 3 according to a reference voltage 2. The warm-up circuit 1 comprises an inverter 14, a PWM control unit 12 and an RC circuit. The circuit diagram of the warm-up circuit for CCFLs of the present invention is shown in FIG. 7. The PWM control unit 12 is a control IC manufactured by Highland Electronic Co., Ltd. (a DC/DC control IC with a part No. 34063). A DC voltage of 12V is used as the reference voltage 2. The inverter 14 adopts the Royal Type inverter circuit architecture.

Reference is made to FIG. 3 again. The present invention makes use of the PWM control unit 12 connected to the inverter 14 and used for outputting a control signal for the inverter 14. Therefore, the inverter 14 supplies, under the control of the PWM control unit 12, a drive power to the CCFL 3 according to the reference voltage 2. Moreover, the PWM control unit 12 is further connected to an RC circuit. By adjusting the resistance value and capacitance value of the RC circuit, the output time of the control signal can be adjusted.

Figure 4:
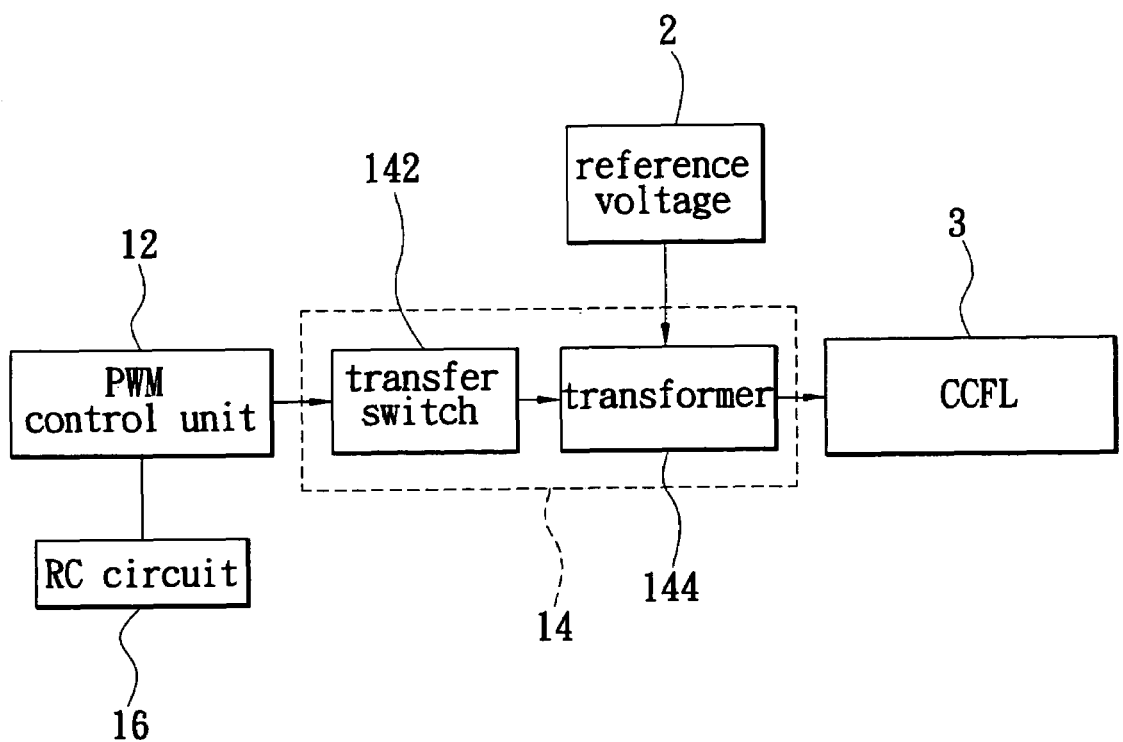
FIG. 4 is another block diagram of a warm-up circuit for CCFLs of the present invention.

Reference is made to FIG. 4 as well as FIG. 3. The inverter 14 in FIG. 3 comprises a transformer 144 and at least a transfer switch 142. The transformer 144 is connected to the CCFL 3 via a secondary side coil for conversion of the drive power. The transfer switch 142 is connected to the PWM control unit 12, the reference voltage 2 and a primary side coil of the transformer 144. The transfer switch 142 is controlled, by the control signal that is output from the PWM control unit 12, to perform on/off switching actions and transfers the reference voltage 2 to the primary side coil of the transformer 144 in an alternating way.

Figure 5:
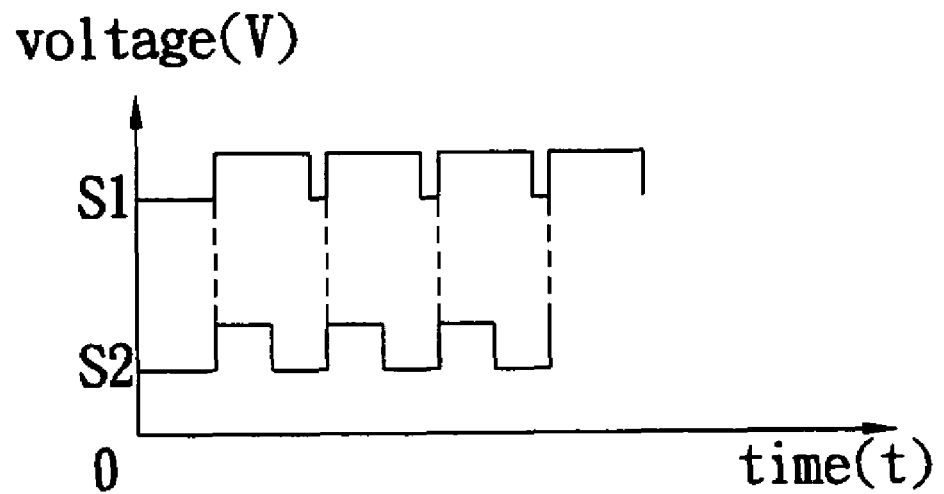
FIG. 5 is a waveform diagram of a first control signal and a second control signal of the present invention.

Reference is made to FIG. 5 as well as FIG. 4. The y-axis represents voltage v, while the x-axis represents time t. The control signal output by the PWM control unit 12 is based on an optimum warm-up time for an optimum scan time predetermined in the scanner. The lamp current supplied by the inverter 14 to the CCFL 3 can be divided into a first control signal S1 and a second control signal S2. The duty cycle of the first control signal S1 is longer than that of the second control signal S2.

When the scanner (not shown) is in the warm-up time, the PWM control unit 12 will output the first control signal S1 to the inverter 14 for controlling on/off switching actions of the transfer switch 142 and transferring the reference voltage 2 to the CCFL 3 via the transformer 144 in an alternating way. At this time, the lamp current supplied to the CCFL 3 is a first lamp current. Furthermore, after the brightness of the CCFL 3 of the scanner (not shown) reaches a stable state, the PWM control unit 12 will output the second control signal S2 to the inverter 14 for supplying a second lamp current to the CCFL 3. The first lamp current is higher than the second lamp current.

Figure 6:
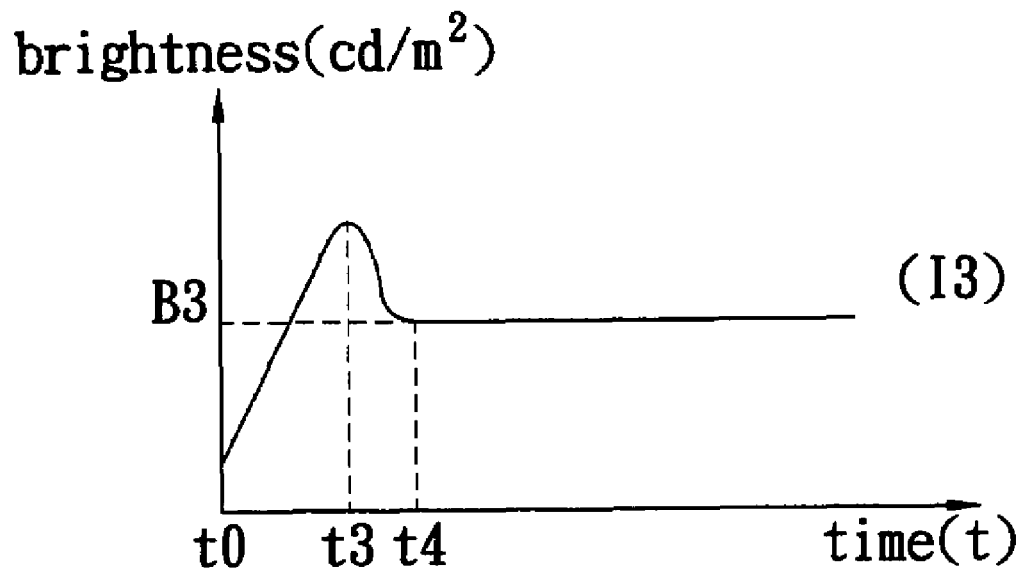
FIG. 6 is a warm-up diagram of a lamp current of a CCFL of the present invention.

Reference is made to FIG. 6 as well as FIG. 4. The y-axis represents the brightness of the CCFL 3 in $cd/m^2$, while the x-axis represents time t. During time t0 to t3, the lamp current I3 supplied to the CCFL 3 is the first lamp current. The PWM control unit 12 outputs the first control signal S1 to control the inverter 14 to obtain the first lamp current. At this time, the first lamp current lets the CCFL enter a quick warm-up state, i.e., a warm-up time.

During time t3 to t4, the lamp current I3 supplied to the CCFL 3 is the second lamp current. The PWM control unit 12 outputs the second control signal S2 to control the inverter 14 for obtaining the second lamp current. At this time, the lamp current flowing into the CCFL 3 changes from the larger first lamp current to the smaller second lamp current to enter into a scan state.

At the time t3, the lamp current I3 changes from the first lamp current to the second lamp current. Next, the brightness B3 of the CCFL 3 will reach a stable state after a short period of time (t3 to t4). After the time t4, the scanner (not shown) enters the scan state.

Reference is made to FIG. 6 as well as FIGS. 3 and 5. The first control signal S1 and the second control signal S2, both of which are output by the PWM control unit 12 in this order, control the inverter 14 to supply the first lamp current and the second lamp current of the drive power to the CCFL 3. An RC circuit 16 connected to the PWM control unit 12 is further made use of in the present invention to adjust the warm-up time (i.e., the time from t0 to t3) by adjusting the resistance value and capacitance value of the RC circuit 16. Moreover, the duty cycle of the first control signal S1 is longer than that of the second control signal S2. This design will control the inverter 14 to provide a larger first lamp current and a smaller second lamp current.

Reference is made to FIG. 6 again. After the time t4, the brightness of the CCFL 3 will be kept stable so that the scanner (not shown) can start scanning. This stable brightness B3 depends on the value of the second lamp current. Moreover, when the scanner (not shown) scans, the warm-up circuit of the present invention will momentarily get a feedback signal of the emission status of the CCFL 3 and a feedback signal of the heating status of the CCFL 3. After comparison and processing, the second lamp current supplied to the CCFL 3 can be changed in real time for adjusting the brightness and the dissipated-heat of the CCFL 3.

To sum up, the present invention proposes a warm-up circuit for CCFLs for adjusting the brightness of a CCFL through using PWM technique in a scanner. When the scanner is turned on, a first lamp current is supplied to the CCFL to reach the brightness of the CCFL quickly. Next, a second lamp current is supplied to the CCFL for keeping the brightness of the CCFL stable. Moreover, when the scanner scans, the warm-up circuit of the present invention will momentarily get a feedback signal of the emission status of the CCFL and a feedback signal of the heating status of the CCFL. After comparison and processing, the second lamp current supplied to the CCFL can be changed in real time for adjusting the brightness and the dissipated heat of the CCFL.

Therefore, the present invention can effectively shorten the warm-up time of a scanner and can control the constant lamp current to enhance the operation efficiency of the scanner and reduce heat produced by the lamp to avoid structural deformation and also improve the scanning quality.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A warm-up circuit for CCFLs disposed in a scanner for controlling the brightness of a CCFL according to a reference voltage, said warm-up circuit comprising:
    an inverter connected to said CCFL and providing a drive power to said CCFL; and
    a PWM control unit connected to said inverter and outputting a first control signal to said inverter in a warm-up time and outputting a second control signal to said inverter to control said inverter supplying power to said CCFL in a scan time;
    wherein said inverter includes:
        a transformer connected to said CCFL via a secondary side coil for conversion of said drive power; and
        at least a transfer switch connected to said PWM control unit, said reference voltage and a primary side coil of said transformer, said transfer switch being controlled by said first control signal and said second control signal in order to perform on/off switching actions and transfer said reference voltage to the primary side coil of said transformer in an alternating way.

2. The warm-up circuit for CCFLs as claimed in claim 1, wherein said first control signal and said second control signal control said inverter to provide a first lamp current and a second lamp current of said drive power for said CCFL, respectively.

3. The warm-up circuit for CCFLs as claimed in claim 1, further comprising an RC circuit connected to said PWM control unit and adjusting said warm-up time by adjusting resistance and capacitance values of said RC circuit.

4. The warm-up circuit for CCFLs as claimed in claim 2, wherein a duty cycle of said first control signal is longer than that of said second control signal.

5. The warm-up circuit for CCFLs as claimed in claim 2, wherein said first lamp current is higher than said second lamp current.

6. A warm-up circuit for CCFLs disposed in a scanner for controlling the brightness of said CCFL according to a reference voltage, said warm-up circuit comprising:
- an inverter connected to said CCFL and providing a drive power for said CCFL; and
- a PWM control unit connected to said inverter and outputting a first control signal and a second control signal to said inverter to control said inverter supplying power to said CCFL;

wherein said inverter includes:
- a transformer connected to said CCFL via a secondary side coil for conversion of said drive power; and
- at least a transfer switch connected to said PWM control unit, said reference voltage and a primary side coil of said transformer, said transfer switch being controlled by said first control signal and said second control signal in order to perform on/off switching actions and transfer said reference voltage to the primary side coil of said transformer in an alternating way.

7. The warm-up circuit for CCFLs as claimed in claim 6, wherein said first control signal and said second control signal control said inverter to provide a first lamp current and a second lamp current of said drive power to said CCFL, respectively.

8. The warm-up circuit for CCFLs as claimed in claim 6, further comprising an RC circuit connected to said PWM control unit for adjusting a time for said PWM control unit to output said first control signal by adjusting the resistance value and capacitance value of said RC circuit.

9. The warm-up circuit for CCFLs as claimed in claim 7, wherein a duty cycle of said first control signal is longer than that of said second control signal.

10. The warm-up circuit for CCFLs as claimed in claim 7, wherein said first lamp current is higher than said second lamp current.

* * * * *